Figure 1:
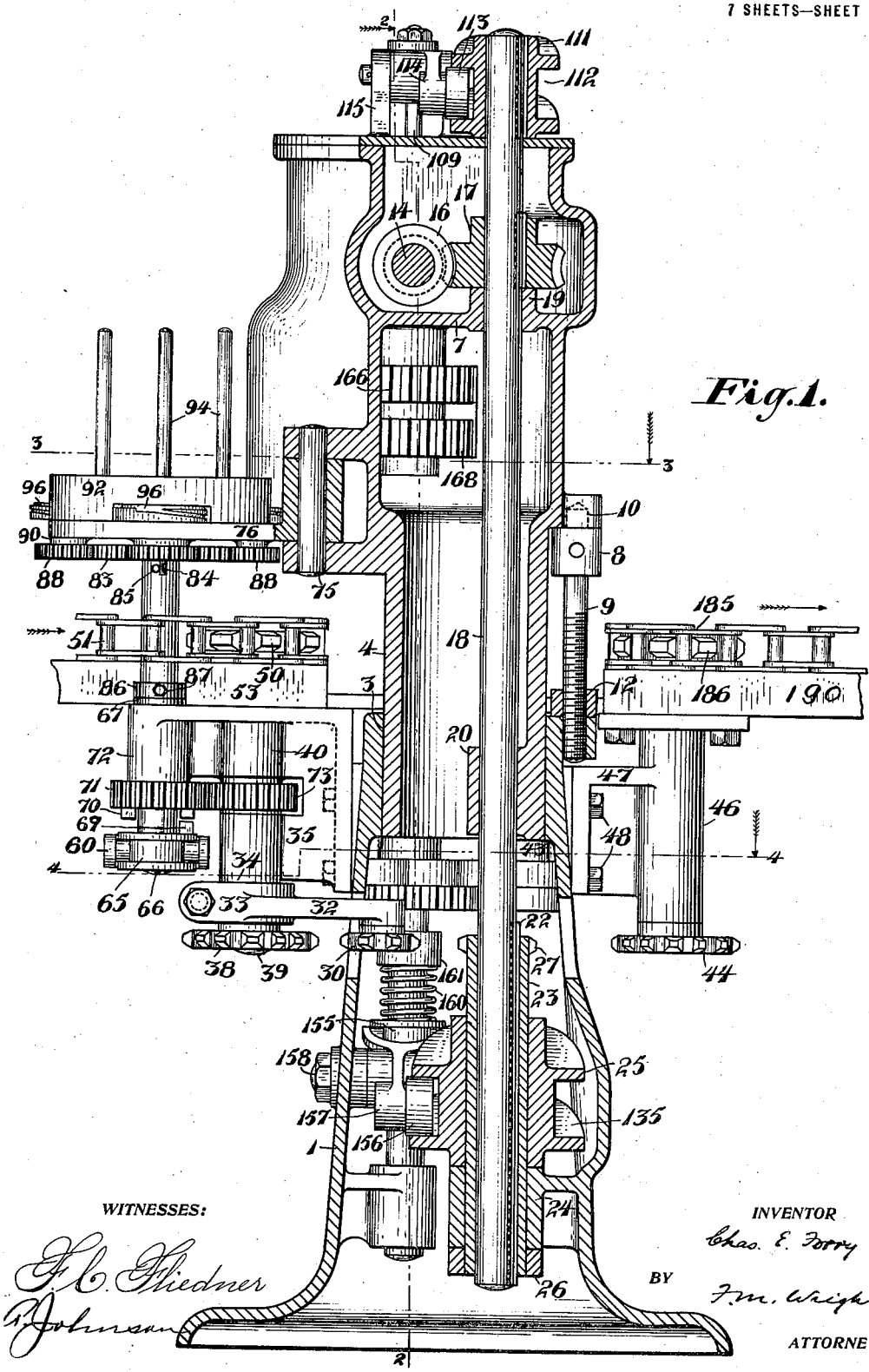

C. E. FORRY.
CAN END CURLING, CAN ASSEMBLING AND SEAMING MACHINE.
APPLICATION FILED JULY 11, 1910.

1,167,059.

Patented Jan. 4, 1916.
7 SHEETS—SHEET 1.

WITNESSES:

INVENTOR
Chas. E. Forry
BY
F. M. Wright,
ATTORNEY

C. E. FORRY.
CAN END CURLING, CAN ASSEMBLING AND SEAMING MACHINE.
APPLICATION FILED JULY 11, 1910.

1,167,059.

Patented Jan. 4, 1916.
7 SHEETS—SHEET 3.

WITNESSES:

INVENTOR
Chas. E. Forry,
BY
F. M. Wright,
ATTORNEY

C. E. FORRY.
CAN END CURLING, CAN ASSEMBLING AND SEAMING MACHINE.
APPLICATION FILED JULY 11, 1910.
1,167,059.
Patented Jan. 4, 1916.
7 SHEETS—SHEET 4.
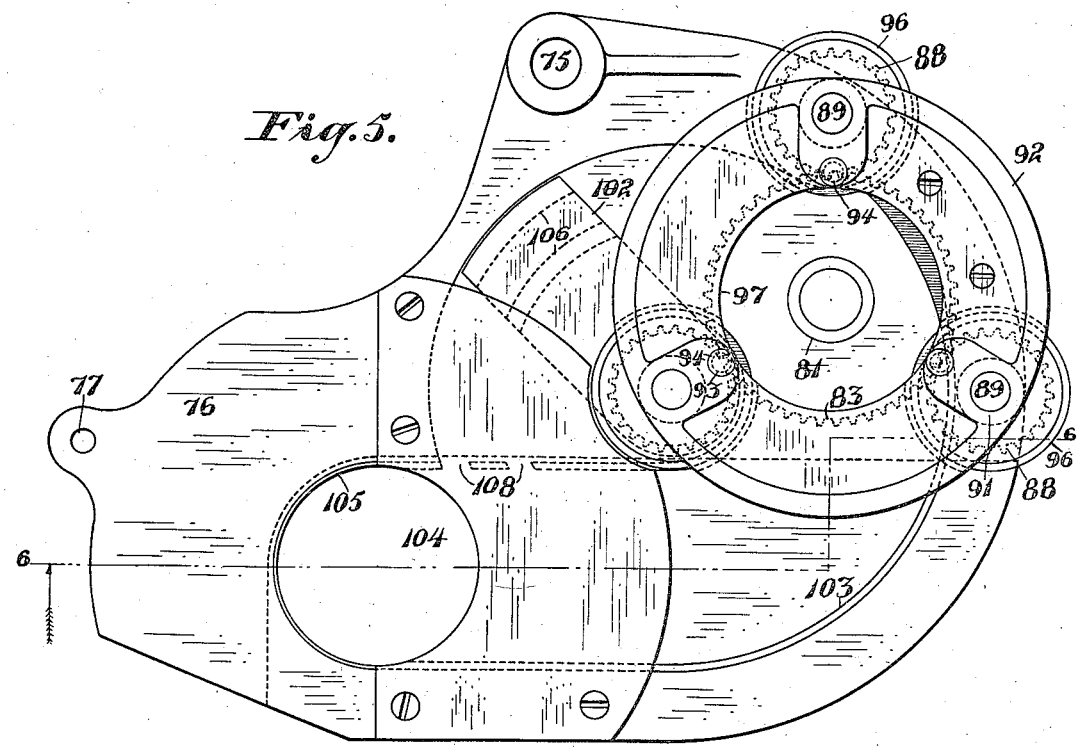
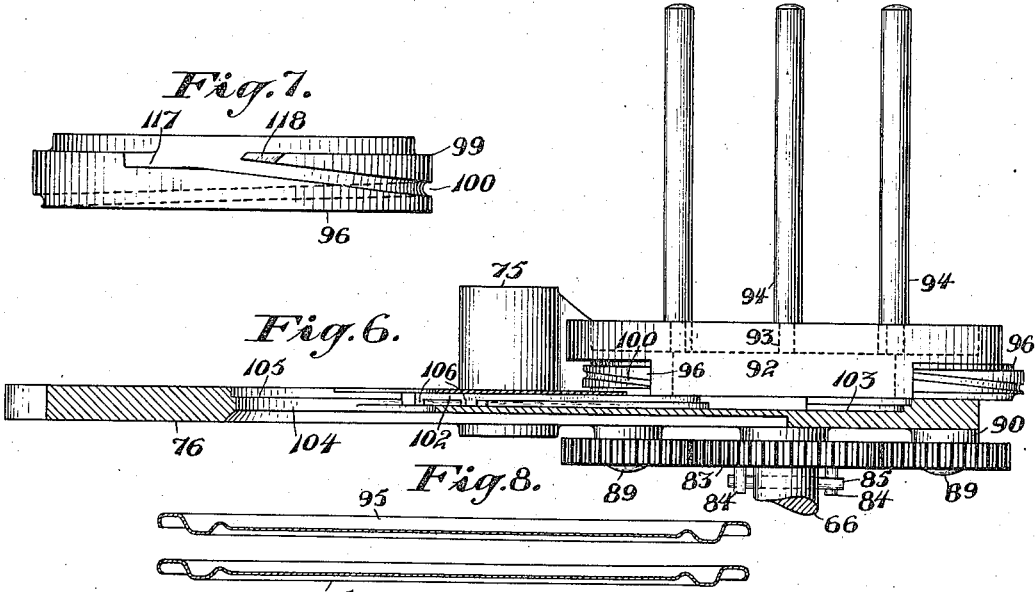
WITNESSES:
INVENTOR
BY
ATTORNEY C. E. FORRY.
CAN END CURLING, CAN ASSEMBLING AND SEAMING MACHINE.
APPLICATION FILED JULY 11, 1910.
1,167,059.
Patented Jan. 4, 1916.
7 SHEETS—SHEET 5.
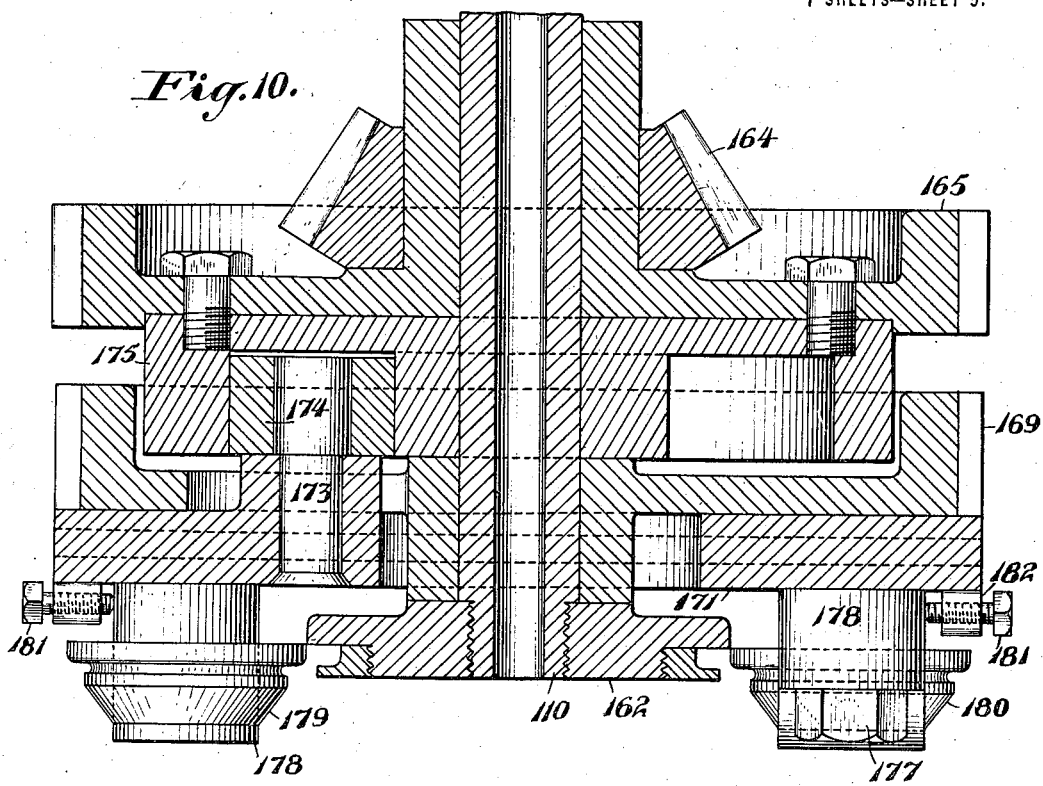
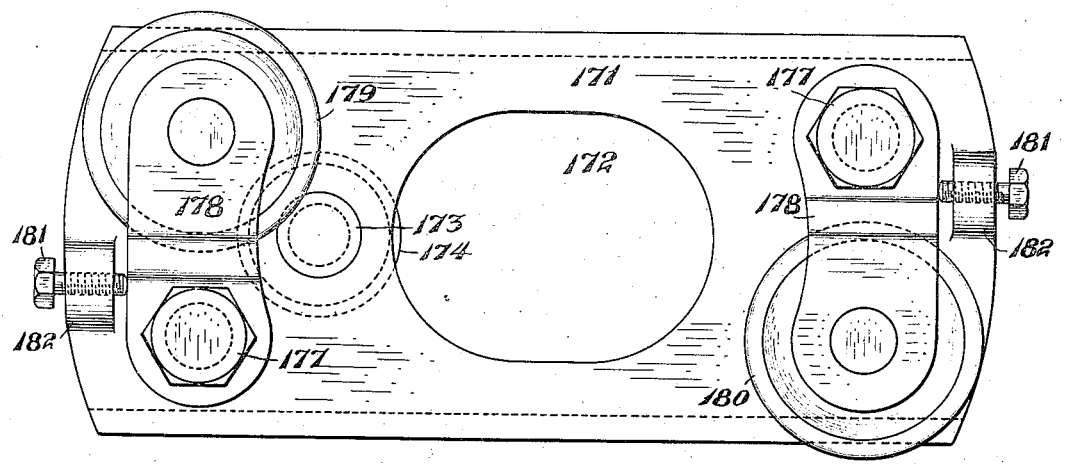
WITNESSES:
INVENTOR
Chas. E. Forry
BY
ATTORNEY

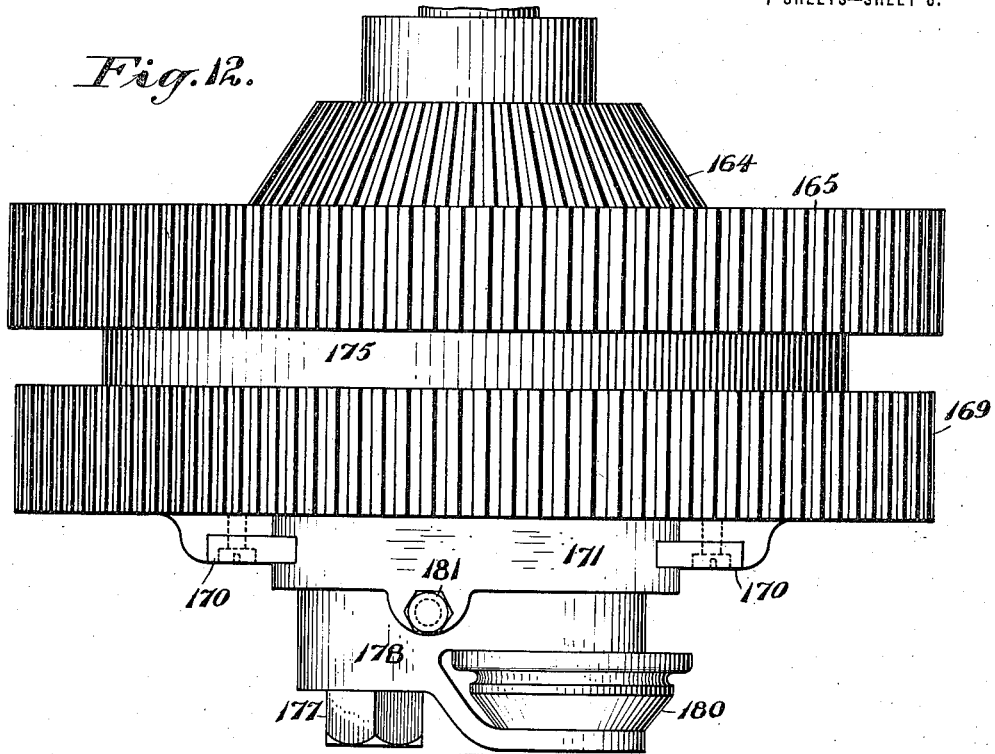
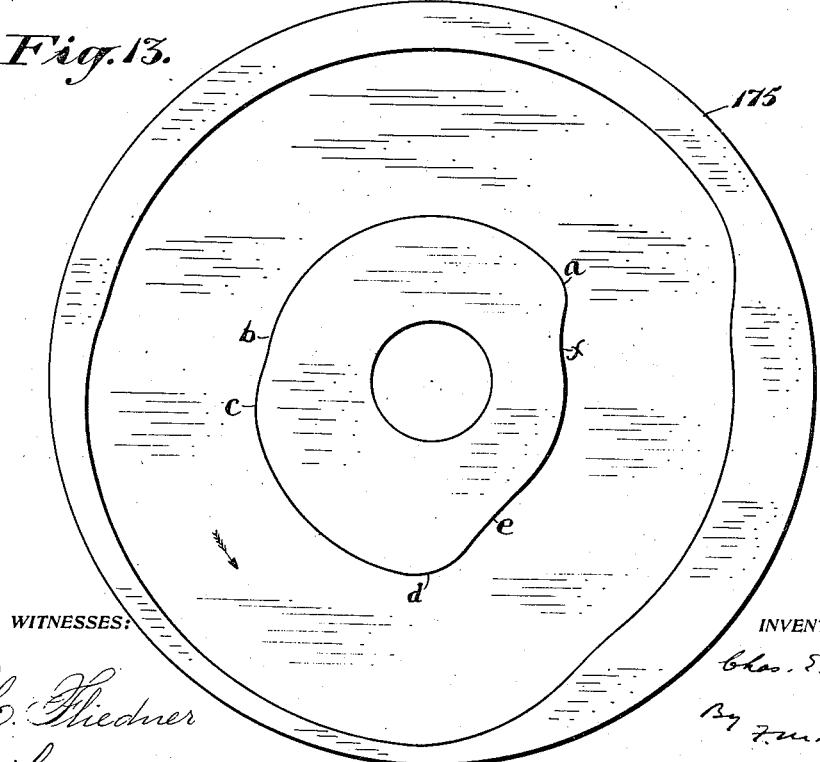

C. E. FORRY.
CAN END CURLING, CAN ASSEMBLING AND SEAMING MACHINE.
APPLICATION FILED JULY 11, 1910.
1,167,059.
Patented Jan. 4, 1916.
7 SHEETS—SHEET 7.
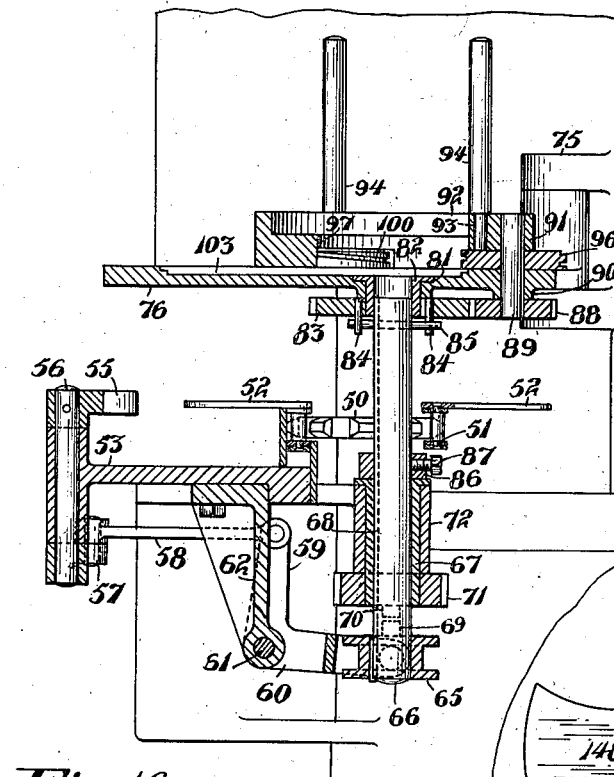
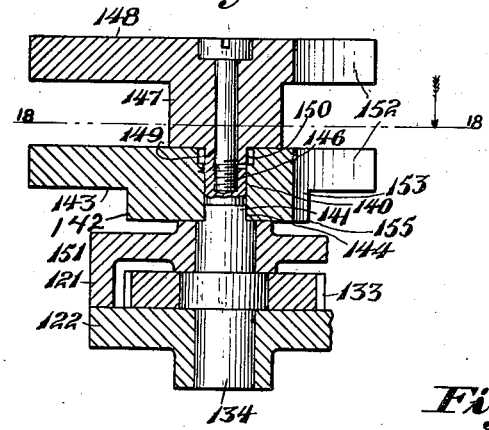
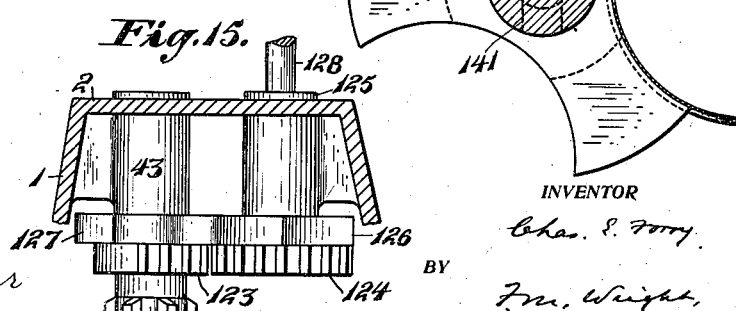

UNITED STATES PATENT OFFICE.

CHARLES E. FORRY, OF OAKLAND, CALIFORNIA, ASSIGNOR, BY MESNE ASSIGNMENTS, TO AMERICAN CAN COMPANY, OF SAN FRANCISCO, CALIFORNIA, A CORPORATION OF NEW JERSEY.

CAN-END CURLING, CAN ASSEMBLING AND SEAMING MACHINE.

1,167,059.      Specification of Letters Patent.      Patented Jan. 4, 1916.

Application filed July 11, 1910. Serial No. 571,315.

*To all whom it may concern:*

Be it known that I, CHARLES E. FORRY, a citizen of the United States, residing at Oakland, in the county of Alameda and State of California, have invented new and useful Improvements in Can-End Curling, Can Assembling and Seaming Machines, of which the following is a specification.

Although the art of seaming can ends onto can bodies by rolling the edges of the can end and the edge of the can body together into the form of a "double" or "lock" seam has been practised for a great number of years, all of the machines heretofore built and used for accomplishing this purpose, so far as I am aware, have certain inherent defects, among which may be mentioned the following, as belonging to those machines which are automatic or semi-automatic in character: First, in many such machines, the can body with its contents is suddenly stopped and started at an unduly high speed, at least two, and often more, times before the can end is seamed to the body; this results in a certain loss from the spilling of the contents of the can each time that such starting and stopping take place. Second, other machines consist of a great multiplicity of parts, many of which must necessarily be changed when a change is made in the size of the cans to be seamed, and the parts so interchanged, as well as other parts must all be adjusted with the greatest accuracy to adapt the machine for the new size of cans, thus involving a large expenditure of highly skilled labor, as well as of time, and the stoppage for an undue time, whenever such alterations are made, of other machinery and processes dependent thereon. Third, many machines heretofore constructed have been provided with no means whereby the can ends are accurately sized and made perfect before being fed into position for assembling, thus always involving the possibility of imperfect or badly sized can ends either forming defective seams with the bodies, or becoming caught in parts of the mechanism of the machine with undesirable consequences. Fourth, many machines heretofore constructed have had the inherent defect that, if a can body is fed to the machine without a corresponding can end being fed thereto, or placed in a proper position for the assembling operation, the extracting means, provided for finally removing the can from the machine, will have no part on which it may bear to do its intended work, and, therefore, to remove the can body it may be necessary to stop the machine, with the attendant evil consequences, and to cut away the unextracted can body.

In my machine I have overcome all of these defects, as well as certain other minor defects, by the means and with the specific results hereinafter particularly described.

Figure 2:
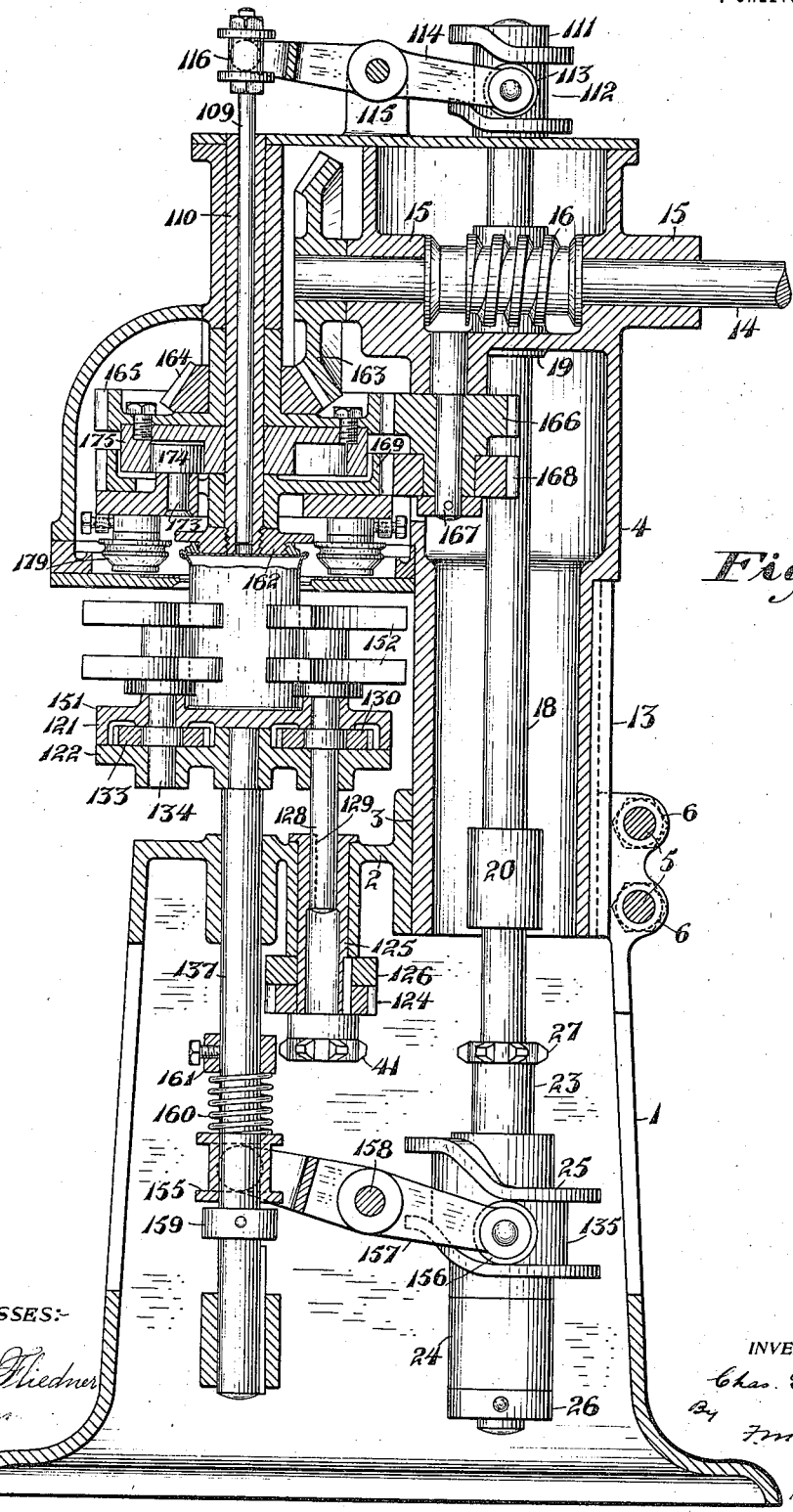
Figure 3:
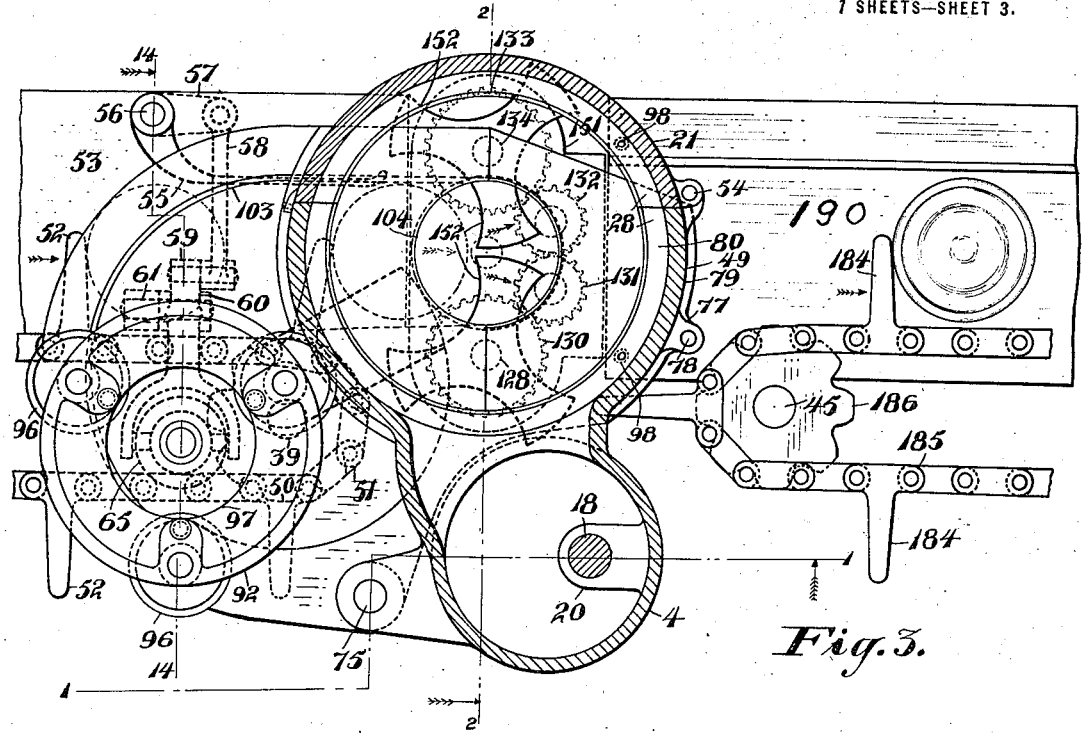
Figure 4:
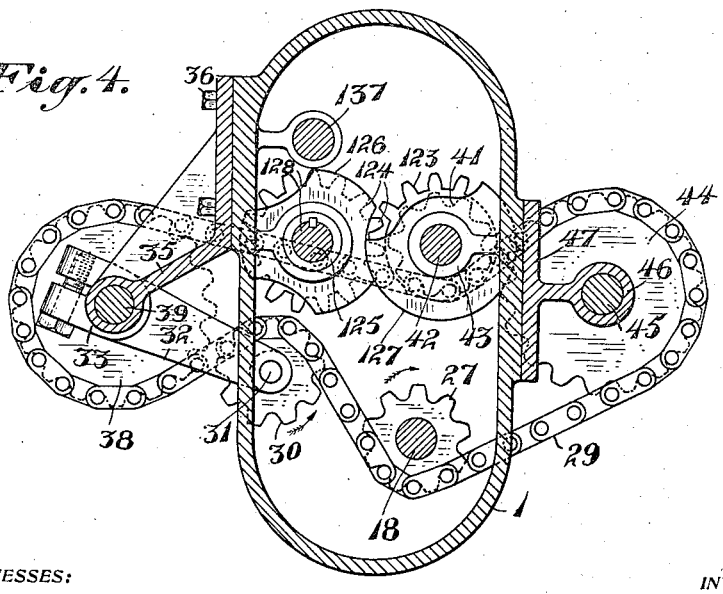

In the accompanying drawings, Figure 1 is a vertical section of the machine, taken on the line 1—1 of Fig. 3; Fig. 2 is a vertical section on line 2—2 of Figs. 1 and 3; Fig. 3 is a horizontal section on the line 3—3 of Fig. 1; Fig. 4 is a horizontal section on the line 4—4 of Fig. 1; Fig. 5 is a top plan view of the plate for supporting the mechanism for curling the can ends; Fig. 6 is a vertical view on the line 6—6 of Fig. 5; Fig. 7 is a side view of one of the curling disks; Fig. 8 is a vertical central section of a can end before it has been curled; Fig. 9 is a similar view thereof, after it has been curled; Fig. 10 is a vertical section of the differential gear wheels for operating the slide for the seaming rollers; Fig. 11 is a bottom plan view of the slide and the rollers operated thereby; Fig. 12 is a side view, of the parts shown in Fig. 10; Fig. 13 is a bottom plan view of the cam for said slide; Fig. 14 is a vertical section on the line 14—14 of Fig. 3; Fig. 15 is a detail vertical section showing the mutilated gear and the parts immediately connected therewith; Fig. 16 is a vertical section of upper and lower turrets; Fig. 17 is a plan view of an upper turret; Fig. 18 is a horizontal section on the line 18—18 of Fig. 16.

Referring to the drawing, 1 indicates the hollow base or lower frame section, having a closed top 2 formed with a cylindrical flanged opening 3, to form a vertical bearing for the lower end of the upper frame section 4. The wall of said bearing is vertically divided, and the parts thereof can be drawn together by bolts 5 and nuts 6 to clamp said upper section at any desired elevation in said bearing.

For the purpose of adjusting the height of the upper section on the lower section there is provided a socketed lug 10 extending from said upper section which rests upon the head 8 of a screw 9 of which the upper end enters the socket in said lug, the lower end of said screw being screwed into a lug extending from the lower section, there being also screwed upon said screw a jam nut 12 for preventing the slipping of the nut in the adjusted position of the screw. The upper section is also provided with a feather 13 to maintain the upper section, and the parts carried thereby, in suitable register with the lower section.

14 indicates a horizontal driving shaft, driven from any suitable source of power, and mounted in suitable bearings 15 in said upper section. On said driving shaft is a worm 16 which meshes with a worm wheel 17 keyed upon a vertical shaft 18 rotating in an upper bearing 19 formed in a web 7 of said upper section and a lower bearing 20 extending inwardly from the wall of the upper section near its lower end. Upon the lower portion of said shaft 18 is slidably keyed, as shown at 22 to permit of adjustment of the upper section, a sleeve 23 or hollow shaft, rotating in a bearing 24, extending inwardly from the base of the lower frame section, said sleeve being supported in said bearing by a cam collar 25, hereinafter more fully described, and being held against upward movement in said bearing by a collar 26 secured thereto. Said sleeve carries at its upper end a sprocket pinion 27 around which travels a sprocket chain 29 which travels also around an idler sprocket wheel 30 on a stud shaft 31, depending from an arm secured by a friction collar 33 to the lower end of a bracket 35, attached by screws 36 to the base or lower section, (see Fig. 4). Said sprocket chain then travels around the sprocket wheel 38 on a shaft 39 having its bearing in a tube 34, and an upper tube or bearing 40 formed on said bracket. It then travels around a pinion 41 upon a shaft 42 having its bearing in a bracket 43 extending inwardly from said lower section. It then passes around a sprocket wheel 44 on the lower end of a shaft 45 rotating in a bearing 46 formed integral with a bracket 47 attached by screws 48 to the lower base section.

By the mechanism above described, the shaft 18 transmits rotation to the shaft 39. The upper end of said shaft 39 carries a sprocket wheel 50, which engages an endless sprocket chain 51, having arms 52 extending outwardly therefrom, by which the cans are fed in succession to the machine, said cans traveling upon a table 53, one end of which is secured to the bracket 35. As each can in turn is fed to the machine it actuates a curved arm 55, (see Figs. 3 and 14) on the upper end of a vertical shaft 56, having its bearing in the table 53, the lower end of said shaft 56 carrying an arm 57, to the end of which is connected a link 58, which is connected to the upwardly extending arm 59 of a bell crank lever 60, having a pivot pin 61, extending from a bracket 62 secured to the lower side of the table 53, the other arm of which lever engages a clutch collar 65 slidable vertically on a shaft 66 within a sleeve or hollow shaft 67, said shaft 66 having a keyway 68 engaging a suitable feather in the collar, so that the shaft rotates with the collar. From the upper side of said collar extends a lug 69 adapted to engage either one of two lugs 70 depending from a gear wheel 71, which is secured to said sleeve 67, said sleeve rotating in a bearing 72 forming an extension of the bracket 35. Said gear wheel 71 meshes with a gear wheel 73 on said shaft 39, so that the sleeve 67 rotates with the shaft 39.

By reason of the above construction, when a can, advanced by an arm 52 on the sprocket chain, impinges upon the arm 55, it causes the collar 65 to be raised, thereby bringing the lug 69 into engagement with one or the other of the lugs 70 and causing said collar 65 to be rotated with the sleeve 67, and thereby also causing the shaft 66 to rotate with said sleeve, and with the shaft 39.

Hinged to swing horizontally from the upper frame section 4, as shown at 75, is a can end feed plate 76, having an apertured lug 77 to enable it to be attached by a screw 78 to the bottom 79 of a hood 49. The hood 49 is hinged, as shown at 54, to a part 21 of the upper section formed to correspond with said hood. To said hood 49 and part 21 are secured bases 28 having grooves 80 to receive any lubricating oil that may be discharged from the rotating elements of the apparatus, said oil being adapted to be withdrawn by nozzles 98. Said plate has an aperture 81 and is countersunk around the top of said aperture, and in said aperture is a sleeve 82 to which is secured a gear wheel 83 from the under side of which depend lugs 84. Said shaft 66 extends upwardly into said sleeve 82 and a pin 85 extends through said shaft adjacent to the lower end of said sleeve 82 and projects on both sides thereof so as to be adapted to engage the said depending lugs 84 and impart rotation to said gear wheel 83. This construction permits of the plate 76 and gear wheel 83 being removed when it is desired, as hereinafter explained, to change the plate for operating on cans of different sizes. Said shaft 66 is upheld in the sleeve 82 by a collar 86 secured to said shaft by a set screw 87. By withdrawing said screw, said shaft can be lowered, so that its upper end no longer enters said sleeve 82, and the said plate 76 can be swung to one side upon the pivot pin 75 for the purpose of obtaining access to the chuck, or under side of the seaming head hereinafter described. Said gear wheel 83 engages pinions 88 upon vertical shafts 89, having lower bearings 90 in the plate 76 and upper bearings 91 in a post support 92 on the feed plate 76. Said pinions thus rotate all in the same direction and at the same speed. Said post support 92 has sockets 93, preferably three in number, for supporting posts 94 which guide the can ends 95 in their descent. Upon the shafts 89 of said pinions are secured curling disks 96, which rotate in suitable recesses formed in the under side of said post support 92 and project slightly inward within the central aperture 97 of said support. The can ends are inserted between these posts in a pile or stack, and are fed one at a time from the bottom of the pile to the can end carrier, hereinafter described. Each curling disk, more particularly shown in Fig. 7, has a flange or extended lower portion 99. Said posts are set so that their sides are flush with the edge of said aperture 97 and also flush with the edges of the upper or contracted portions of the disk 96, so that the can ends, when fed between said posts, drop through said aperture and rest upon said lower portions 99. In said lower portion 99 is formed a helical groove 100 the end of said groove being open at the top of the flange. The walls of this groove at the upper end do not extend in the same peripheral direction up to the top of said enlarged portion or flange, but one of said walls is deflected, as shown at 117, and the other wall is cut off, as shown at 118, so that when said disks, in their rotation, arrive at the points where the can ends are directly opposite to, or over, said groove ends, the whole pile of can ends will drop the vertical distance of the thickness of a can end.

As the curling disks rotate, the lowest can end, the edge of which has dropped in the recesses or open upper ends of the grooves 100, is, by said rotation, separated from the remaining can ends of the pile by the tongues formed by the ends of the upper walls of the grooves, the remaining can ends of the pile being supported on said flanged portions 99 of the disks, until said recesses arrive at the lowest remaining can end of said pile. As the disks rotate, said can end is depressed thereby, and, during this downward movement, its edge is curled. This is effected by reason of the fact that the grooves 100 become shallower as they extend downward. Said grooves are also rounded, so as to suitably engage the edge of the can end, and, by the inward pressure thereon caused by the gradual reduction in depth of the grooves, and the approach of their bottoms toward each other, a curling effect is produced on the can end.

I realize that it has been a common practice to curl inwardly the edges of the flanges of can ends to lessen the work involved in the initial, or spinning, operation of the can seaming process, but heretofore this has been usually performed by the operation of a separate machine, and at the time the can ends were originally made by punching and pressing machines. The packing and shipping as well as the necessary handling to which the can ends are subsequently subjected expose the edges of the flanges to the liability of injury, and when an edge of a flange is injured, there is always the possibility that it will not form a truly tight joint with the body of the can, or that the can ends having an imperfect flange will be caught in some portion of the mechanism, with disastrous consequences to the machine or to some of the finely adjusted parts thereof. Furthermore, it has been found in practice, that when can ends are curled in the machines usually employed for such purposes, there results a great variation in sizes, owing to the fact that such machines are adjustable to several different sizes of can ends and the adjustment to any particular size is usually made by the operators, without due regard to strict accuracy. For these reasons, I prefer to make use of can ends which have not been curled inward at the time of manufacture, and to curl the same immediately before they are fed to the machine, thereby securing in every instance perfectly curled edges, uniformly sized to the requirements of the machine, and avoiding the disadvantages attendant, as above described, upon can ends curled under the system at present in vogue. Furthermore, in order that the operation of curling the ends may be carried out strictly in conjunction with the operation of can assembling, and that no can ends shall be curled until needed and that no excess of curled ends shall accumulate, I prefer to curl each end separately, and only momentarily in advance of the time at which it is to be used, and, if the supply of can bodies fed to the machine should be interrupted, I prefer that no ends be curled until the supply of can bodies is resumed.

To the most central of the three disks 96 is secured a pusher 102, which, when the operation of curling of the can end has been completed, engages said can end and feeds it into a guideway 103 which guideway leads to an aperture 104 in the table or plate 76, said aperture having in its upper portion a seat 105 to receive the can ends. Said aperture 104 is of such diameter that a can end cannot pass through the aperture before it is seamed on the can body but when it is so seamed the can end can pass therethrough. In order to guide the can ends in said guideway to said aperture, said pusher is formed with depending ribs 106 concentric with the center of rotation of the pusher, said ribs being of such thickness that the can end will always be engaged by said ribs even though the pusher itself might pass over said can end. The inner wall of the guideway is formed with two openings or slots 108 which permit the said ribs to pass through the said wall, the wall itself being sufficiently low to permit the main body of the pusher to pass thereover.

When the can end has arrived at its seat, 105, a stem 109 descends in a sleeve 110 secured to and depending from the upper frame section, and holds said can end to its seat in the plate 76. The mechanism for causing said descent comprises a sleeve 111 secured to the upper end of the shaft 18 and having a circumferential grooved cam 112, which actuates a cam roller 113 mounted on a stud on the end of a lever 114 fulcrumed upon a standard 115 upon the top of the upper section, said lever being forked at the other end and engaging a collar 116 secured to said stem.

The cans are moved and guided to a position immediately beneath the aperture 104 by mechanism more particularly shown in Figs. 2, 3 and 4. Said mechanism comprises a mutilated gear wheel 123 mounted on the shaft 42 and having preferably only four teeth. Said gear wheel 123 meshes intermittently with a whole gear wheel 124, having, preferably, fifteen teeth and secured on a sleeve 125, which sleeve also carriers a Geneva stop 126 which engages a Geneva locking disk 127 on the shaft 42. By means of this arrangement, from the continuous motion of the shaft 42, there is imparted to the sleeve 125 an intermittent motion, said sleeve moving through a portion, preferably one-third, of a revolution while the shaft 42 also moves through the same portion of a revolution, and then remaining at rest during the remainder of the revolution of the shaft 42. A similar intermittent movement is thus imparted to a shaft 128 slidably secured in said sleeve 125 by means of a feather 129. On said shaft 128 is secured a gear wheel 130, which meshes with a pinion 131, best shown in Fig. 3, which in turn meshes with a pinion 132, which meshes with a gear wheel 133 on a shaft 134. Said pinions 131 and 132 are identical in size and form, as are likewise gear wheels 130 and 133. All of the shafts of said gears 130, 133, and pinions 131, 132, have their bearings in a gear box formed of upper and lower gear box sections, 121 and 122, the lower section being carried upon the reduced upper end of a stem 137, hereinafter described, and the upper section being secured to said lower section.

The upper end of each of the shafts 128, 134, is adapted to support turrets, either one or two in number, according to the height of the cans to be operated upon, which turrets are supported upon the corresponding shaft in the following manner, as illustrated more particularly in Figs. 16, 17, 18. The upper end of the shaft has a reduced portion, which, in the upper part 140, is cylindrical, and in the lower part is of the same width in one direction as said upper part 140, and in the direction at right angles thereto is of the same width as the lower end of the shaft, so that there are formed two diametrically opposite lugs 141 on the upper end of the shaft. The hub 142 of the lower turret 143 is formed at the bottom with two diametrically opposite recesses 144 which respectively engage the lugs 141 on the top of the shaft and prevent rotary movement of said turret on said shaft. If only one turret is supported thereon it is secured to the shaft by means of a comparatively short screw which is screwed into a threaded socket 146 in the said reduced portion of the shaft. But when two turrets are used, for cans of greater height, a longer screw is employed, and the hub 147 of the upper turret 148 is formed on each side of the central aperture thereof with two diametrically opposite depending lugs 149, which respectively engage diametrically opposite recesses 150 in the upper side of the lower turrets. Then the aforesaid long screw is employed to screw the two turrets and the shaft together. Said screw passes through central apertures in the turrets. It will be understood that the form of these turrets will be adapted for cans of various diameter, and the above construction provides a ready means for the employment of interchangeable turrets as the diameter and height of the cans may require. Since these turrets turn inward toward each other, the can is engaged between the peripheral circular recesses 152 in the turrets, and it is then moved to a central position beneath the aperture 104, and when it has arrived at such a position it is firmly clamped in the recesses of the respective turrets, and is at the same time, if not perfectly cylindrical, pressed into a cylindrical form by said turrets, since the recesses 152, when exactly opposite each other, are in the form of a surface of a cylinder of the size of the can body.

The stem 137, carrying the gear box 151, the turrets, and can body, is now raised by the following mechanism:—The cam collar 25 on the shaft 18 has a circumferential grooved cam 135, which actuates a roller 156 upon the end of a lever 157 pivoted on a stud 158 extending inward from the side of the lower frame section 1, the other end of said lever being forked and engaging a grooved collar 155 loosely surrounding said stem 137 between a fixed collar 159 on said shaft and the lower end of a coiled spring 160 around the shaft, the upper end of said coiled spring 160 abutting against a collar 161 adjustably secured upon said shaft. Thus as the shaft 18 rotates, the stem 137, with the can thereon, is raised or lowered. The connection for raising said stem is made resilient in order to avoid injury to the can or can ends which might otherwise be caused by variations in the height of the cans. As the can rises, it carries with it a can end, which at this time rests in the seat 105. At the same time the stem 109 which, as hereinbefore described, holds the can end to its seat, moves upward in synchronism with the movement of the can, this movement being effected by the circumferential grooved cam 112. The can end will thus be raised to a position in which both the can end and can are clamped in assembled form between the gear box 151 and a seaming chuck 162, which chuck is secured upon the lower end of the sleeve 110 and is therefore stationary. The can and can end are now in a position to be acted upon by the seaming rollers.

I realize that a rod, acting in line with the axis of the can, has been used on certain can end seaming machines heretofore built, but the purpose of this rod invariably has been so far as I am aware the extraction of the seamed and finished can from engagement with the chuck against which the seaming operation was performed. When such is the purpose of the rod, the following inherent defect of operation comes into play. If no can end is placed in the assembling position to be seamed onto the can body, the can body is raised into engagement with the chuck usually employed in such machines and is acted on by a series of rollers, but as no can end has been supplied for the operation, the central rod on its descent meets with no part of the can by which the can body may be forced downward from the chuck, and, as the upper part of the can body has usually become fixedly attached to the chuck through the operation of the rollers, the only means of disengagement possible is through the stoppage of the machine and the cutting away by hand, and with proper instruments, of the engaged body of the can. On the contrary, in my machine the central stem 109 in no wise performs the function of an extractor. At an early stage in the cycle of operations on any particular can body and corresponding can end, the stem begins its descent, and, just subsequent to the moment when the can end is deposited on the seat 105 by the pusher 102, the stem 109 comes into contact with the can end at its exact center and forcibly holds the same in place on the seat 105, while the can body is being raised by the lifting means, until the topmost part of the can body comes into contact with the can end, when the can body, can end and stem 109 are all raised in strict synchronism through the further action of the lifting means to such height as is necessary to engage the can end with the chuck 162. During the remainder of the cycle of operations on that particular can, the stem does not of necessity at any time come into contact with the can end belonging thereto, but the operation of extracting the said can from engagement with the chuck is performed through the agency of entirely separate means, which I will now describe.

Each of the lower turrets 143 has a lower hub or extractor 155 formed with circular recesses 153 of the same radius as, and registering vertically with, those in the turrets for receiving, guiding, holding and shaping the can body, as above described, and these recesses 153 necessarily engage the lower part of the body of a can coming between the rotating turrets in the regular manner. The bottoms of the said extractors 155 are located in such a position with regard to the top face of the gear box 151, that a projecting part as a flange or a rolled seam on the bottom part of a can body will pass beneath the said extractors. The result of such partial clamping of the can body immediately above the flange or seam on the bottom edge, thereof, is that, when the turrets and gear box are drawn downward, and away from the parts which have operated on the upper portion of the can body, the can body is constrained to move downward, with the said turrets and gear box, through the downward pull exerted by the recessed hubs or extractors on the seam or flange on the lower part of the can body, a downward pull sufficient to overcome any undue adhesion between the upper part of the said can body and any means which may have performed work of an improper nature upon it.

An important feature of my invention is that the speed of sprocket chain is so regulated with reference to the time occupied in the end seaming operation and the extracting of the finished can, that each can arrives at the seaming position at the exact time when, and no sooner than, it is necessary for the can to be received and engaged by the turrets since the arms of the feed chain are so arranged that the can will be advanced by said arms just ahead of the recesses in the turrets and arrive at the seaming position at the same time as the turrets come to their clamping position, as more particularly illustrated in Fig. 3. I therefore avoid the spilling of the liquid contents of the can which would be caused by starting or stopping too suddenly, as heretofore has been the result of a much more rapid approach to, and departure from, the can seaming position. Although the endless chains travel continuously, they travel so slowly that there is sufficient time for the seaming operation to be completed on one can before the next succeeding can arrives at the seaming position. Since therefore I employ a constantly moving feeding device to bring the can to the seaming position, my invention is a great improvement upon those machines which employ a carrier having an intermittent, or step, motion to bring the cans to the seaming position and convey them therefrom, and in which the motion, when it actually takes place, must necessarily be more rapid than a continuous motion operating at the same speed. Furthermore, in order to make the speed of the cans as slow as possible, that is, to occupy as much time as possible in traveling a given distance, I cause the last part of this travel to be made in time in which the can is also being lifted toward its engagement with its corresponding can end, that is, the can is thus lifted before the cessation of the transverse motion of the can body toward the position of alinement with the aperture 104, and the parts for performing these functions are adjusted accordingly.

The cam 25 and the intermittently operating mechanism consisting of the mutilated gear wheel 123 and the gear wheel 124 are so arranged that the rotating movement of the clamping members begins during the latter part of the descent of the stem 137, in continued during the period of rest of said stem at the lowermost point thereof, and ends during the first part of the ascent of the said stem.

Upon the end of the driving shaft 14 is secured a bevel gear 163 which meshes with a bevel gear 164 secured to a gear wheel 165. Said gear wheel thus receives rotation, and it imparts said rotation to a pinion 166 on a depending stud shaft 167, to which pinion 166 is secured a pinion 168 of slightly larger diameter which pinion 168 meshes with a gear wheel 169 rotating around the sleeve 110, which gear wheel is therefore of slightly smaller diameter than the gear wheel 165. To the under side of the gear wheel 169 there are screwed parallel plates 170, forming a guideway for a slide piece 171, more particularly shown in Figs. 10, 11 and 12. Said slide piece is formed with a central elongated aperture 172, to permit it to move laterally with reference to the hub of the lower gear wheel 169. Secured to the upper side of the said slide piece is a vertical stud 173 carrying at its upper end a cam roller 174 which is actuated by grooved cam 175 secured to the under side of the gear wheel 165, and the connections thereof with the shaft 14 are such, that the upper and lower gear wheels 165 and 169 make respectively 20 and 21 revolutions for each revolution of the shaft 14, and it is evident that, in the same time, the slide piece makes one complete reciprocation.

Pivoted upon stud shafts 177 screwed into the lower side of the slide piece are carriers 178, forked at their free ends, and carrying, respectively, a spinning roller 179 and a seaming roller 180, there being provided adjustable supports for holding said rollers up to their work, consisting of screws 181 screwed through lugs 182 depending from said slide piece 171. Said slide piece is given a rapid rotary movement, since it is carried around with the lower gear wheel, which makes 21 revolutions for each revolution of the shaft 14, and in addition to said rapid rotary movement, it is given a comparatively slow reciprocating movement with reference to its center of rotation. The character of this reciprocating movement will be best understood by reference to Fig. 13, illustrating the cam, which is the instrument for effecting said reciprocation. While the roller 174 is traveling in the part of the cam which is circular, between the points $a$ and $b$, the slide piece is in the normal or central position, and the rollers 179 and 180 are out of contact with the edge of the can end. It is during this part of the rotation of the cam that the operations of removing the seamed can and replacing it by another can and can end take place. Between the points $b$ and $c$ of the said can groove the spinning roller 179 is moved inward to contact with the can end. Between the points $c$ and $d$ of the cam, the spinning operation takes place. Between the points $d$ and $e$ of the cam, the spinning roller is withdrawn from the can end and the seaming roller is moved toward the can end. Between the points $e$ and $f$ of the cam, the seaming roller is in operation. Between the points $f$ and $a$ of the cam, the seaming roller is withdrawn from the can.

The gear box or lifter 151 now descends, carrying with it the completed can. While it is descending to its lower position, the turrets rotate and discharge the completed can and receive a succeeding can body, the completed can being discharged on to a table 190 to a position in which it is adapted to be engaged and advanced by one of a series of arms 184, extending from an endless sprocket chain 185 which is driven by a sprocket wheel 186, secured to the shaft 45 hereinbefore described.

I realize that, in machines heretofore designed for the accomplishment of the same purposes as that attained by my machine, slides, or levers, or both, have been employed, on which rollers are bolted for operating on the ends of cans, but, in many such machines where slides are employed, the slides are adjustable and serve merely as carriers for the rollers, and as guides for compelling the rollers to travel in a truly straight line. In my machine, on the contrary, two rollers are mounted in separate carriers adjustably affixed on a single slide, the said rollers being of differing shapes and each roller performing a different function though the carriers therefor are mounted on the same slide. It has been found possible to impart to the said single slide, having a very much longer bearing and therefore greater rigidity, such a variety of motion that all operations required of the two rollers are carried out through each complete reciprocation of the said slide. Therein also does this portion of my machine differ from other machines serving similar purposes, for, in such machines, it has been necessary to employ not only more than one slide to secure a proper variety of motion, but, in some instances, it has even been necessary to make use of several sets of slides, or levers, or both, each set revolving around a separate center, the can body being moved successively from one center to the next in order to undergo the complete cycle of operations.

It will be readily seen from the description that the machine can be very quickly adjusted for different heights of cans, as all that is necessary is to loosen the bolts 5 and nuts 6, remove or add the upper turrets, and turn the screw 9 to raise or lower the upper section, and then tighten the bolts 5 and nuts 6, the operation occupying only six minutes.

To adjust for different diameters of cans it is necessary also to change the lower turrets and the plate 76, the whole operation occupying fifteen minutes.

I claim:—

1. A machine of the character described, comprising upper and lower frame sections, means supported by said upper section for curling can ends and for seaming said can ends on to can bodies, and means supported by said lower section for transporting can bodies, for clamping said can bodies for bringing said can bodies into assembled relation with said can ends, and for releasing, and discharging the seamed cans, said upper section being vertically adjustable with reference to said lower section, substantially as described.

2. A machine of the character described, comprising upper and lower frame sections, means supported by said upper section for curling can ends and for seaming said can ends on to can bodies, and means supported by said lower section for clamping said can bodies, said upper section being vertically adjustable with reference to said lower section, substantially as described.

3. In a machine of the character described, the combination of a lower frame section having a suitable guideway, an upper frame section slidable vertically in said guideway, means supported by the lower frame section for conveying can bodies to the place to be seamed, means supported by said upper frame section for curling can ends and seaming said can ends upon said can bodies, and means for adjustably supporting said upper frame section in said guideway, substantially as described.

4. In a machine of the character described, the combination of upper and lower frame sections, the upper section being adjustable vertically relative to the lower section, a lifting device for can bodies, supported by the lower section, a plate pivotally attached to the upper section having an aperture adapted to register vertically with said can lifting device, and means affixed to said plate for curling can ends, substantially as described.

5. In a machine of the character described, the combination of upper and lower frame sections, the upper section being adjustable vertically relative to the lower section, a lifting device for can bodies, supported by the lower section, a plate pivotally attached to the upper section having an aperture adapted to register vertically with said can lifting device, means rotatably affixed to said plate for curling can ends, and a pusher actuated by said means adapted to seat a curled can end in said aperture, substantially as described.

6. In a machine of the character described, the combination of upper and lower frame sections, the upper section being adjustable vertically relative to the lower section, a lifting device for can bodies, supported by the lower section, a plate pivotally attached to the upper section having an aperture adapted to register vertically with said can lifting device, means rotatably affixed to said plate for curling can ends, and a pusher actuated by said means adapted to seat a curled can end in said aperture, said plate having a depressed guide way terminating at said aperture, substantially as described.

7. In a machine of the character described, the combination of upper and lower frame sections, the upper section being adjustable vertically relative to the lower section, a lifting device for can bodies, supported by the lower section, a plate supported by the upper section, and having an aperture registering vertically with said can lifting device, means affixed to said plate for curling can ends, and means supported by said plate for moving said curled can ends to said aperture.

8. In a machine of the character described, the combination of a frame, a device for lifting can bodies, a plate attached to the frame, and having an aperture adapted to register vertically with said can body lifting device, and means affixed to said plate for curling can ends, said means being out of alinement with said aperture.

9. In a machine of the character described, the combination of a frame, a lifting device for can bodies, a plate attached to the frame having an aperture adapted to register vertically with said can lifting device, means rotatably fixed to said plate for curling can ends, and a pusher adapted to push can ends after having been acted upon by said rotatable means to said aperture.

10. In a machine of the character described, the combination of a frame, a device for lifting can bodies, a plate attached to the frame having an aperture adapted to register vertically with said can body lifting device, means rotatably fixed to said plate for curling can ends, and a pusher adapted to push can ends after having been acted upon by said rotatable means to said aperture.

11. In a machine of the character described, the combination of a frame, a lifting device for can bodies, a plate secured to the frame having an aperture registering vertically with said can lifting device, means rotatably fixed to said plate for curling can ends, and a pusher actuated by said means and adapted to push a curled can end to said aperture, said plate having a depressed guideway terminating at said aperture.

12. In a machine of the character described, the combination of a lifter, a clamping device movable on said lifter and supported exclusively thereby, means for controlling the vertical movement of the lifter, means for actuating said movable clamping device, and unitary means for operating said controlling and actuating means.

13. In a machine of the character described, the combination of a lifter, rotatable clamping members carried by said lifter, means for controlling the vertical movement of the lifter, means for rotating said members in unison to clamp a can body and unitary means for operating said controlling and rotating means.

14. In a machine of the character described, the combination of a lifter comprising a gear box, a plurality of gears therein operatively connected with each other, a splined shaft for one of said gears, a sleeve around said shaft rotating therewith, means for raising said lifter, and means operated by said gears and adapted to clamp a can body supported by said lifter, substantially as described.

15. In a machine of the character described, the combination of a lifter comprising a gear box, a plurality of gears therein operatively connected with each other, a splined shaft for one of said gears, a sleeve around said shaft rotating therewith, means for raising said lifter, and turrets on said lifter, respectively operated by two of said gears, substantially as described.

16. In a machine of the character described, the combination of a lifter comprising a gear box, a plurality of gears therein operatively connected with each other, a splined shaft for one of said gears, a sleeve around said shaft rotating therewith, means for raising said lifter, and turrets on said lifter, respectively operated by two of said gears, and unitary means for controlling the vertical movement of said lifter and for rotating said sleeve, substantially as described.

17. In a machine of the character described, the combination of a lifter, a pair of intermittently rotating can clamping members mounted thereon, each member comprising upper and lower parts, the upper part being detachable from the lower and the lower being removable from the lifter, substantially as described.

18. In a machine of the character described, the combination of a lifter, a pair of intermittently rotating can clamping members mounted thereon, and each member comprising upper and lower parts, the upper part being detachable from the lower, substantially as described.

19. In a machine of the character described, the combination of a lifter, and a pair of intermittently rotating can clamping members removably mounted thereon, substantially as described.

20. In a machine of the character described, the combination of a plurality of gears operatively connected with each other, a lifter, clamping members carried by said lifter, and operative connections between said gears and clamping members.

21. In a machine of the character described, the combination of a plurality of gears operatively connected with each other, a lifter, means for raising said lifter, turrets on said lifter, and operative connections between said turrets and two of said gears.

22. In a machine of the character described, the combination of a plurality of gears operatively connected with each other, a lifter, means for raising said lifter, turrets on said lifter respectively operated by two of said gears, and unitary means for controlling the vertical movement of said lifter, and for rotating one of said gears.

23. In a machine of the character described, the combination, with means for feeding can bodies, of a can end feed plate having a circular aperture of diameter to prevent the can end passing therethrough before it is seamed on to the can body but permitting it to pass therethrough when so seamed, two intermittently rotating disks having notches in their peripheries, said notches being circular in contour, and means for rotating said disks, whereby, with each movement of the disks, notches on the respective disks register with each other so that their contours have a common center vertically beneath the center of said aperture, said circular notches when thus registering with each other being adapted to clamp a can body adapted to have seamed thereon a can end of the size determined by said aperture, substantially as described.

24. In a machine of the character described, the combination, with means continuously moving for feeding can bodies, of two intermittently rotating disks having notches in their peripheries, said notches being circular in contour, means for rotating said disks, whereby, with each movement of the disks, notches on the respective disks register with each other so that their contours have a common center and a lifter upon which said disks are supported and with which they move vertically, means for raising said lifter while the turrets are moving, and means for moving said lifter above said feeding means, substantially as described.

25. In a machine of the character described, the combination, with operating means for curling can ends, of continually moving means for conveying can bodies, a power transmitting device for said operating means, and means actuated through the medium of a can body conveyed by said conveying means for operatively connecting said power transmitting device with said can end curling means, substantially as described.

26. In a machine of the character described, the combination, with operating means for curling and feeding can ends, of continually moving means for conveying can bodies, a power transmitting device for said operating means, and means actuated through the medium of a can body conveyed by said conveying means for operatively connecting said power transmitting device with said can curling and feeding means, substantially as described.

27. In a machine of the character described, the combination of disks adapted to operate upon the edge of the can end, a rotating shaft, connections between said shaft and disks for rotating said disks in unison, a continually moving endless sprocket chain having outwardly extending arms adapted to engage and advance can bodies, a rotary power transmitting device, a clutch for connecting said device with said shaft, and means for operating said clutch adapted to be actuated by the movement of a can body engaged by one of said arms, substantially as described.

28. In a machine of the character described, the combination of a post support, posts supported thereby, curling disks having peripheral downwardly sloping grooves, the upper ends of the grooves being open, and means for rotating said disks in unison, the peripheries of said disks being flush with the sides of said posts, substantially as described.

29. In a machine of the character described, the combination of a post support, posts supported thereby, curling disks having flanges with peripheral downwardly sloping grooves, the lower walls of the grooves being deflected and the upper walls cut off to form enlarged openings in said flanges, the bottoms of said grooves in the respective disks approaching each other in the lower portions, means for rotating said disks in unison, the peripheries of said disks being flush with the sides of said posts, substantially as described.

30. In a machine of the character described, the combination of means for maintaining can ends in vertical alinement, curling disks having peripheral downwardly sloping grooves having open upper ends, and mechanism for rotating said disks in unison, the bottoms of said grooves at the tops of said disks being flush with those surfaces of said means which are substantially in contact with said can ends.

31. In a machine of the character described, the combination of curling disks for curling the edge of a can end, a pusher attached to one of said curling disks for feeding the can end to a seaming position, means for feeding can bodies to the seaming position, seaming devices arranged adjacent to said position, and mechanism for actuating the above-named elements in harmony, substantially as described.

32. In a machine of the character described, the combination of means for advancing can bodies to a seaming position, curling disks for curling can ends, a pusher attached to one of said curling disks for pushing a can end to the seaming position, and means adapted to be controlled by a can body advanced by said advancing means for operating said curling disk and pusher, substantially as described.

33. The combination with a can end feed plate having an aperture, and a guideway leading to said aperture, a rotary device having a pusher arm arranged to push a can end so as to register with said aperture, said aperture having a seat for the can end, means for advancing can bodies to a seaming position vertically below said seat, and means adapted to be controlled by a can body so advanced for operating said pusher, substantially as described.

34. The combination of means for advancing can bodies to a seaming position, curling disks, a pusher secured to one of said curling disks for pushing a curled can end to a seaming position and walls for guiding said can end to said seaming position, the inner wall having an opening therethrough, and the pusher having a circular rib adapted to register with said opening, substantially as described.

35. The combination of a plate having an aperture, and means for guiding a can end into register with said aperture, a stationary seaming chuck, a stem moving vertically through said chuck, seaming rollers adapted to act on a can end engaged by said chuck, a lifter for a can body, and means for lifting said lifter so that said can body can engage the can end, substantially as described.

36. The combination of a plate having an aperture adapted to seat a can end, a stationary seaming chuck, a stem movable vertically through said chuck, seaming rollers adapted to act on a can end engaged by said chuck, a lifter for a can body, means for clamping the can body on said lifter, means for depressing said stem on to a can end on said seat, means for raising said lifter so that the can body thereon contacts with the can end on said seat, and means for raising said lifter and stem in unison, substantially as described.

37. The combination of a plate having an aperture adapted to seat a can end, a stationary seaming chuck, a stem movable vertically through said chuck, seaming rollers adapted to act on a can end engaged by said chuck, a lifter for a can body, means for depressing said stem on to a can end on said seat, means for raising said lifter so that the can body contacts with the can end on said seat, and means for raising said lifter and stem in unison, substantially as described.

38. In a machine of the character described, the combination of a support against upward movement for a can end, a lifter for a can body, a device carried by said lifter and adapted to engage and clamp said can body, said device upon the downward movement of the lifter being adapted to engage a lower flange or seam upon the can body to depress the same, substantially as described.

39. In a machine of the character described, the combination of a rotary seaming head, having a guideway in a plane at right angles to the axis of rotation of said seaming head and open at both ends, a slidepiece reciprocable transversely in said guideway, a spinning and a seaming roller carried by said slidepiece, and a cam for operating said slidepiece.

40. The combination of a hollow stem, a stem vertically movable in said hollow stem, a chuck upon the end of said hollow stem, a seaming head rotatable about said hollow stem, a device having a cam groove and also rotatable about said hollow stem, a reciprocable slidepiece carried by said head and actuated by said cam, a spinning and a seaming roller carried by said slidepiece, and means whereby said device and seaming head rotate at different speeds, substantially as described.

41. The combination of a stem, a chuck upon the end of said stem, a seaming head rotatable about said stem, a device having a cam groove and also rotatable about said stem, a reciprocable slidepiece carried by said head, and actuated by said cam, a spinning and a seaming roller carried by said slidepiece, and means whereby said device and seaming head rotate at different speeds, substantially as described.

42. In a machine of the character described, the combination of a lifter, a stem therefor, a collar adjustably secured on said stem, a grooved collar slidable on said stem below said collar, a coiled spring interposed between the grooved collar and said collar, a forked lever engaging said grooved collar, a roller carried by said lever, a grooved cam for controlling said roller, and means for rotating said cam, said lifter comprising a gear box containing a plurality of gears, driven by a splined shaft affixed to one of their number, and an intermittently rotatable sleeve in which said splined shaft is slidable, substantially as described.

43. In a machine of the character described, the combination of a lifter, a stem therefor, a nut adjustably secured on said stem, a collar slidable on said stem below said nut, a coiled spring interposed between said collar and nut, a forked lever engaging said collar, a roller carried by said lever, a grooved cam for controlling said roller, means for rotating said grooved cam, a gear box containing a plurality of gears and carried by said lifter, said gears driven by a splined shaft affixed to one of them, an intermittently rotatable sleeve in which said splined shaft is slidable, said sleeve being rotatably movable in a bearing but fixed as regards movement in the direction of the axis of the splined shaft, and means for intermittently rotating said sleeve, substantially as described.

44. In a machine of the character described, the combination of a lifter, and intermittently rotating can clamping members mounted thereon, means for vertically reciprocating said lifter, and means for beginning the rotating movement of the clamping members during the latter part of the descent of said lifter, continuing said rotating movement during the period of rest at the lowermost point of descent of said lifter and ending said rotating movement during the first part of the ascent of said lifter, substantially as described.

45. In a machine of the character described, the combination of a lifter, conveyers to and from said lifter, and intermittently rotating can clamping members mounted on said lifter, adapted to receive a can body from the first conveyer, and to deliver the same to the second, substantially as described.

46. In a machine of the character described, means for curling the edges of can ends, comprising suitable means for maintaining a number of can ends in vertical alinement, a plurality of disks at the base of said alining means, said disks rotating in unison and adapted to engage with the upper portions of their peripheries the lowermost only of said can ends, each of said disks being formed with a groove extending partly around the lower portion of its periphery, and open at the upper end, whereby the edge of the lowermost can end enters said grooves at one point of each revolution of said disks, said grooves being formed at the bottom to forcibly curl inward to the desired shape and extent the edge of said lowermost can end, as the disks rotate, and said grooves being open at the bottom, whereby the said can end drops from its engagement with said disks, substantially as described.

47. In a machine of the character described, means for curling the edges of can ends, comprising a plurality of disks rotating in unison and adapted to engage with the upper portions of their peripheries the can end, each of said disks being formed with a groove extending partly around the lower portion of its periphery, and open at the upper end, whereby the edge of the can end enters said grooves at one point of each revolution of said disks, said grooves being formed at the bottom to forcibly curl inward to the desired shape and extent the edge of said can end, as the disks rotate, and said grooves being open at the bottom, whereby the said can end drops from its engagement with said disks, substantially as described.

48. In a machine of the character described, the combination of upper and lower gear wheels, means for rotating said upper gear wheel, an operative connection between said gear wheels whereby they rotate at slightly different speeds, a grooved cam secured to the upper gear wheel, the lower gear wheel having a slideway extending entirely across its lower side, a slide piece in said slideway having an elongated aperture in the center, spinning and seaming disks adjustably connected to the opposite ends of the slideway, an upward extension from said slide-piece, the lower gear wheel having an aperture through which said extension passes, and a roller on said extension actuated by said cam, substantially as described.

49. In a machine of the character described, the combination of a fixed vertical shaft, a chuck attached to its lower end, and differential rotating gears mounted on said shaft, the lower gear having a guideway across its lower side, and open at both ends, a slidepiece movable in said guideway having an elongated aperture in its center, through which aperture said shaft passes, spinning and seaming disks mounted on opposite ends of said slidepiece, both disks being adjustable with regard to distance between their peripheries and the axial line around which the slide rotates, a roller supported on the upper portion of said slide, and a cam secured to the upper gear and operating said roller, substantially as described.

50. A machine for the described purpose, the same comprising means for supporting can bodies, intermittently rotating devices for clamping, truing and holding can bodies, a can head holder for sustaining a stack of can ends, means for seaming can ends to the can bodies, while held by the rotating devices, mechanism for successively releasing the can ends and delivering the same in alinement with the open end of the held can bodies, and means for assembling said can ends and can bodies for seaming in said position.

51. In a machine of the character described, in combination; a plate having an aperture in which is adapted to be seated a can end; seaming mechanism located above said plate; a carrier for positioning a can body below said seaming mechanism and in alinement therewith; movable means for clamping said can body when in said position; and a lifter adapted to raise the can body through said aperture to engage the can end and raise the latter with the can body to a position to be operated upon by said double seaming mechanism, the can body and end, after being double seamed, being adapted to pass downward through said aperture, substantially as specified.

52. In a machine of the character described, in combination, a plate having an aperture in which is adapted to be seated a can end, seaming mechanism located above said plate, intermittently rotating means for receiving, positioning and holding a can body below said seaming mechanism and in alinement therewith, and a lifter adapted to raise the can body through said aperture to engage the can end and raise the latter with the can body to a position to be operated upon by said double seaming mechanism, the can body and end, after being double seamed, being adapted to pass downward through said aperture, substantially as specified.

53. The combination of a seaming head, seaming rolls carried thereby, means for rotating the head, a support for the can bodies, and means for applying can ends to the bodies comprising a supporting plate extending beneath the seaming head and having an opening therein, the center of which is in axial alinement with the seaming head, the inner walls of said opening being tapered, whereby the can body is rounded up and centered relative to the seaming head, and a member movable underneath said head for engaging and positively placing a can end in the seat on said supporting plate.

54. In a can top seaming machine, the combination of two intermittently rotating feed disks having peripheral recesses adapted to receive a can, means for feeding a cover into line with the can, and means for lifting the can to apply said cover, said lifting means operative while the can is held by said feed disks, and said feed disks adapted to grasp the can between them and bring it to a true contour and hold it to such contour while it is being lifted to apply the cover.

55. In a closing machine, the combination of mechanism for positioning a can into alinement with a seaming head, a can end support located between said seaming head and said can, mechanism controlled by said can for positioning a can end on said support into alinement with said seaming head and assembling mechanism for causing said can and end to be united by said seaming head.

56. In a closing machine, the combination of mechanism for positioning a can into alinement with a seaming head, a can end support located between said seaming head and said can, mechanism controlled by said can while advancing to said seaming head for positioning a can end on said support into alinement with said seaming head, and assembling mechanism for causing said can and end to be permanently united by said seaming head.

57. In a closing machine, the combination of mechanism for positioning a can into alinement with a seaming head, a can end support having centering means located between said can and said seaming head, mechanism controlled by said can for positioning a can end on said support into alinement with said seaming head, and assembling mechanism for moving said can and end in operative relation to said seaming head whereby the can and end are permanently united.

58. In a closing machine, the combination of mechanism for positioning a can into alinement with a seaming head, a can end support located between said can and said seaming head having an opening in alinement with said seaming head for centering a can end with a can, mechanism controlled by a can for positioning a can end on said support into alinement with said seaming head and mechanism for bringing said can end and said seaming head into operative relation whereby the can and end are united by said seaming head.

59. In a closing machine, the combination of mechanism for positioning a can into alinement with a seaming head, a can end support located between said can and seaming head, mechanism controlled by said can for positioning a can end on said support into alinement with said seaming head, mechanism for assembling said can and can end and holding the same in assembling position while being united by said seaming head.

60. In a closing machine, the combination of mechanism for positioning a can into alinement with a seaming head, a can end support located between said can and seaming head having an opening in alinement with said seaming head, for centering a can end with a can, mechanism controlled by a can for positioning a can end on said support into alinement with said seaming head, mechanism for assembling said can and can end, and holding the same in assembled position while being united by said seaming head.

61. In a machine of the character described, the combination of a rotary seaming head, a slidepiece held to and movable on the under side of said seaming head in a plane at right angles to the axis of rotation of said seaming head, a spinning roller and a seaming roller both mounted on the same slidepiece and adapted to be brought successively into operation upon the flange to be formed, and a cam having vertical actuating faces arranged around the axis of the seaming head and rotating and acting in horizontal planes for operating said slidepiece.

62. In a can closing machine, the combination with a horizontally immovable apertured can end feed plate having a seat therein for the holding of a can end in axial alinement with a can body, of mechanism for advancing can bodies into seaming position relative to said apertured plate, and means adapted to be controlled by a can body so advanced for delivering can ends into said apertured can end feed plate.

63. In a can closing machine, the combination with a horizontally immovable apertured can end feed plate, of a seaming chuck, a stem vertically movable through said chuck, seaming rollers adapted to act on a can engaged by said chuck; mechanism for positioning a can body in axial alinement with the apertured can end feed plate, and means adapted to be controlled by a can body so advanced for delivering can ends to said can end feed plate.

64. In a can closing machine, the combination with the seaming rollers, of a can end support for receiving can ends and holding the same in axial alinement with a can body, mechanism for advancing can bodies to be closed into seaming position, means adapted to be controlled by a can body so advanced for delivering can ends to the can end support, means for causing the can end and can body to engage in axial alinement therewith, and mechanism for moving the seaming rollers into engagement with the flange of the can end for seaming the same to the can body.

65. In a can closing machine, the combination with the seaming mechanism, of means for advancing and positioning a can body into vertical alinement with the said seaming mechanism, a horizontally immovable apertured can end feed plate having a seat therein for the holding of a can end in axial alinement with a can body, means adapted to be controlled by a can body so advanced for positioning a can end in said feed plate over the aperture thereof and in axial alinement with the can body to be closed, and vertically movable means for applying the can end to the positioned can body.

66. In a can closing machine, the combination with the seaming mechanism thereof, of means for advancing and positioning a can body to be closed in vertical alinement therewith, inter-connected devices adapted to be controlled by a can body so advanced for conveying and positioning a can end in axial alinement with a can body while positioned beneath the seaming mechanism, and means for positioning the seaming mechanism for permanently uniting the can end to the can body.

67. In a can closing machine, the combination with the seaming mechanism thereof, of means for advancing and positioning a can body beneath and in vertical alinement therewith, and means adapted to be controlled by a can body so advanced for positioning a can end in axial alinement with the can body while positioned beneath the seaming mechanism.

68. In a can closing machine, the combination with the seaming mechanism thereof, of means for advancing and positioning a can body beneath and in vertical alinement therewith, means adapted to be controlled by a can body so advanced for positioning a can end in axial alinement with the can body while positioned beneath the seaming mechanism, and a vertically movable device for applying the can end onto the can body while positioned relative to the seaming mechanism.

69. In a can closing machine, the combination with the seaming mechanism, of means for advancing a can body in vertical alinement therewith, a device for positioning a can end in axial alinement with a can body positioned beneath the seaming mechanism, mechanism for actuating said device and comprising separably inter-engaging parts one of which is connected with said device and the other of which is connected with the power mechanism of the machine, and can controlled means engageable by the can to which an end is to be attached and acting on one of said inter-engaging parts, whereby said parts are caused to be inter-engaged.

70. The combination with a seaming head, seaming rolls carried thereby, a can body support situated below the seaming head, an apertured can end support interposed between the seaming head and the can body support, mechanism for advancing a can body onto its support and into vertical alinement with the seaming head, means adapted to be controlled by a can body so advanced for delivering a can end to the apertured can end support and in axial alinement with a can body, and a reciprocating device for applying and holding the can end to the can body during the operation of seaming the said end to the body.

71. A machine for uniting can ends to can bodies, the same comprising a holder adapted to contain a stack of can ends, a horizontally immovable apertured plate forming a holder for the separated can ends and a centering means for the can bodies, means for positioning the can bodies successively in axial alinement with the aperture of said holder-plate, devices for removing the lowermost can ends successively from the stack of ends, and mechanism for positioning the same in axial alinement with the aperture of said can end holder-plate and the can body, in vertical alinement with seaming mechanism, and said seaming mechanism comprising seaming rollers for uniting the can ends to the can bodies.

72. The combination with a seaming head, of a can body support below and in alinement therewith, a can end support interposed between the can body support and the seaming head for holding a can end in axial alinement with a can body positioned on its support, devices for advancing and positioning a can body relative to said support, inter-connected working instrumentalities adapted to be controlled by a can body so advanced for conveying and positioning a can end relative to its support, and a vertically movable device for applying and holding the can end to the can body during the operation of seaming the said end to the body.

73. The combination with a seaming head, of seaming rolls carried thereby, means for advancing and positioning can bodies beneath and in alinement with the seaming head, means for applying can ends to can bodies so positioned comprising a supporting plate situated beneath the seaming head and having an opening therein in vertical alinement with the seaming head, and the inner walls thereof being tapered, whereby a can body may be rounded up and centered relative to the seaming head, and a can end feed device movable beneath said seaming head for engaging and positively placing a can end in the opening of the supporting plate and in axial alinement with a can body positioned beneath the same.

74. The combination with a seaming head, of seaming rolls carried thereby, means for advancing and positioning can bodies beneath and in alinement with the seaming head, means for applying can ends to can bodies so positioned comprising a supporting plate situated beneath the seaming head and having an opening therein in vertical alinement with the seaming head and the inner walls thereof being tapered, whereby a can body may be rounded up and centered relative to the seaming head, a can end feed device movable beneath said seaming head for engaging and positively placing a can end in the opening of the supporting plate and in axial alinement with a can body positioned beneath the same, and means adapted to be controlled by an advancing can body for actuating the can end feed device for delivering can ends to the can end supporting plate.

75. In a can closing machine, the combination with a seaming head, of means for advancing and positioning a can body beneath and in alinement with said head, can end feed mechanism for delivering a can end in axial alinement with a can body positioned beneath the seaming head, means adapted to be controlled by a can so advanced for actuating the can end feed mechanism to receive, convey and position a can end relative to the can body, and a reciprocating device for holding the can end to the can body during the operation of seaming the said end to the said can body.

76. In a can closing machine, the combination with seaming mechanism comprising a seaming head and seaming rolls carried thereby, of means for advancing and positioning a can body beneath and in vertical alinement with the seaming head of said mechanism, interconnected working instrumentalities adapted to be controlled by a can so advanced for conveying a can end beneath the seaming head and in axial alinement with a can body positioned thereunder, and means for holding the can end to the can body during the operation of seaming the said end to said can body.

77. A can closing machine including in combination a can body support, a seaming head located above the said support, a can end support extended beneath the seaming head and held in fixed relation thereto, said support for the can end having an opening therethrough the center of which is in line with the seaming head, said support having means for centering the can ends relative to the opening, means for feeding can ends onto said support at a point outside of the seaming head, devices for engaging the can end on said support and moving the same beneath the seaming head, means for actuating said devices, said means including devices which may be disconnected for rendering the feeding action of said can end feeding means ineffective, and devices controlled by the can bodies fed to the closing machine for actuating the can end feed means.

78. In a can closing machine, the combination with a seaming head, seaming rolls carried thereby, means for rotating said seaming head, a support for can bodies situated beneath the seaming head, means for applying can ends to the can bodies, comprising a member having tapered walls adapted to engage the can body and round up the same to receive the can end, a movable member for positively placing can ends beneath the seaming head and in axial alinement with a positioned can body, and a vertically movable member for holding the can end to the can body during the operation of seaming the said end to said can body.

79. A can closing machine including in combination, a can body support, a rotating seaming head carrying seaming rolls located above said can body support, a support for can ends extending between the seaming head and the can body support and held in fixed relation to the seaming head, said can end support having an opening therethrough the center of which is in line with the axis of the rotating head, said can end support having a seat for the can ends for centering the same relative to said opening, means for feeding can ends on to said seat of the can end support at a point outside of the seaming head, a movable member for engaging the can ends and feeding the same along said can end support on to said seat, means for actuating the said member, and means controlled by the can bodies fed to the closing machine for rendering the said member ineffective in its feeding action except when a can body is fed underneath the seaming head for said can end.

80. A cam closing machine including in combination, a can body support, seaming mechanism located above said can body support, a support for can ends situated between the seaming head and the can body support and held in fixed relation to the seaming head, said can end support having an opening therethrough for the passage of can bodies for receiving a can end, said can end support having a seat for the can ends for centering the same relative to said opening, a movable member for engaging the can ends and feeding the same onto the seat of the can end support, means for actuating the said member, and means controlled by the can bodies fed to the closing machine for rendering the said member ineffective in its feeding action except when a can body is fed underneath the seaming head for said can end.

81. The combination of a seaming head, seaming rolls carried thereby, means for rotating the head, a support for the can bodies, and means for applying can ends to the bodies comprising a supporting plate extending beneath the seaming head and having an opening therein, the center of which is in axial alinement with the seaming head, the inner walls of said opening being tapered, whereby the can body is rounded up and centered relative to the seaming head, a member movable underneath said head for engaging and positively placing a can end in the seat on said supporting plate, and means adapted to be controlled by an advancing can for actuating the said movable member for delivering can ends to the can end supporting plate.

82. A can closing machine including in combination a can body support, a seaming head, means for moving the can body support relative to the seaming head for causing the can body to engage a positioned can end, a supporting plate extended beneath the seaming head and held in fixed relation thereto, said supporting plate having an opening therethrough in line with the seaming head and provided with a tapering wall for engaging and rounding up and centering the can body relative to the seaming head, a seat for a can end in the upper face of the opening for centering a can end relative to the seaming head and in alinement with the can body, a can end holder adapted to contain a stack of can ends for the feeding therefrom one at a time onto the supporting plate beneath the seaming head, a can end feed member movable beneath the stack holder for engaging a can end and feeding the same along the support, to the can end seat therein, and means associated with said member and adapted to be controlled by an advancing can body for actuating the can end feed member to convey and deposit a can end in the seat of the can end support provided for the reception thereof.

83. A can closing machine, the same comprising in combination seaming mechanism composed of a rotatable seaming head and seaming rollers carried thereby, inter-connected means for separately feeding a can body and a can end beneath and in vertical alinement with the seaming head, devices for holding the can end so positioned separated from the can body, and means for applying and holding the can end onto the can body during the operation of seaming the said can end to the said can body.

84. In a can closing machine, the combination with a seaming head, of seaming rollers carried thereby, a seaming chuck associated with the seaming head, mechanism for advancing a can body to a position in alinement with the seaming chuck, a can end support situated beneath the seaming head, and can end feed mechanism adapted to be controlled by an advancing can body for delivering a can end onto the can end support and in axial alinement with a positioned can body.

85. In a can closing machine, the combination with a seaming chuck, of seaming rollers associated therewith, means for advancing a can body beneath the seaming chuck and in alinement therewith, a can end support situated beneath the seaming chuck, mechanism for feeding can ends onto said support and in axial alinement with a can body positioned beneath the same, and a stem vertically movable through the seaming chuck.

86. In a can closing machine, the combination with a seaming head carrying seaming rollers, of a seaming chuck, a can end support positioned below the seaming head, means for advancing a can body beneath the seaming head and in alinement therewith, mechanism thrown into action by a can body so advanced for delivering can ends onto the can end support, and in axial alinement with a positioned can body, and a stem vertically movable through the said seaming chuck.

87. In a can closing machine including in combination a can body support, a rotary seaming head carrying seaming rollers held above the can body support, a can end support situated beneath the seaming head and having an opening therethrough provided with a can end seat, said opening at the can end seat being of a diameter less than the diameter of a can end to be united to a can body, and of a diameter sufficient to permit the passage therethrough of a can end when united to the said can body, means for delivering to said seat of the can end support can ends for attachment to a positioned can body, and means independent of the seaming mechanism, for holding the can end to the can body during the operation of seaming the said end to the said body.

88. In a can end closing machine, the combination with a seaming head carrying seaming rollers, of an apertured can end support positioned beneath the seaming head and having an annular seat therein adapted to receive and hold can ends in axial alinement with a can body, the diameter of the aperture of said plate being greater than that of the diameter of the can end and of such diameter as to permit the passage therethrough of the can end after the seaming thereof to a can body, mechanism for advancing a can body beneath and in alinement with the seaming head, and means thrown into action by the advancing of a can body for delivering can ends onto the seat of the apertured can end support.

89. A machine for uniting can ends to can bodies, the same comprising a holder adapted to contain a stack of can ends, a horizontally immovable apertured plate forming a holder for the separated can ends and a centering means for the can bodies, means for positioning the can bodies successively in axial alinement with the aperture of said holder-plate, devices for removing the lowermost can ends successively from the stack of ends and positioning the same in axial alinement with the aperture of said can end holder-plate and the can body, means adapted to be controlled by an advancing can body for actuating the can end removing and positioning means, and mechanism for uniting the can ends to the can bodies.

In testimony whereof I have hereunto set my hand in the presence of two subscribing witnesses.

CHARLES E. FORRY.

Witnesses:
 FRANCIS M. WRIGHT,
 D. B. RICHARDS.